United States Patent
Toko et al.

(10) Patent No.: US 9,229,252 B2
(45) Date of Patent: Jan. 5, 2016

(54) STEREOGRAPHIC DISPLAY APPARATUS AND VEHICLE HEADLIGHT

(71) Applicant: Stanley Electric Co., Ltd., Tokyo (JP)

(72) Inventors: Yasuo Toko, Tokyo (JP); Fumio Kubo, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 235 days.

(21) Appl. No.: 13/920,778

(22) Filed: Jun. 18, 2013

(65) Prior Publication Data

US 2013/0335459 A1 Dec. 19, 2013

(30) Foreign Application Priority Data

Jun. 18, 2012 (JP) ................. 2012-0136720

(51) Int. Cl.
| | |
|---|---|
| G02F 1/1335 | (2006.01) |
| G02F 1/13 | (2006.01) |
| F21S 8/10 | (2006.01) |
| G09G 5/14 | (2006.01) |
| G09G 3/34 | (2006.01) |
| G02F 1/29 | (2006.01) |

(52) U.S. Cl.
CPC .......... *G02F 1/1313* (2013.01); *F21S 48/1159* (2013.01); *F21S 48/1225* (2013.01); *F21S 48/1731* (2013.01); *G02F 1/133526* (2013.01); *G02F 1/29* (2013.01); *G09G 3/3406* (2013.01); *G09G 5/14* (2013.01); *G09G 2320/068* (2013.01)

(58) Field of Classification Search
CPC ............... G09G 3/36–3/3696; G02B 27/2214; H04N 13/04–13/0497
See application file for complete search history.

(56) References Cited

U.S. PATENT DOCUMENTS

| 7,995,153 B2 * | 8/2011 | Chang .................... 349/15 |
|---|---|---|
| 2006/0215262 A1 * | 9/2006 | Kim .................... 359/465 |
| 2011/0084299 A1 | 4/2011 | Kotani |
| 2012/0025218 A1 | 2/2012 | Ito |
| 2012/0235169 A1 | 9/2012 | Seko et al. |

FOREIGN PATENT DOCUMENTS

| JP | 2001-66547 A | 3/2001 |
|---|---|---|
| JP | 2004-314856 A | 11/2004 |
| JP | 2010-192629 A | 9/2010 |
| JP | 2010-219324 A | 9/2010 |
| JP | 2011-81985 A | 4/2011 |
| JP | 2011-145571 A | 7/2011 |
| JP | 2012-73370 A | 4/2012 |
| WO | 2004/027492 A1 | 4/2004 |

\* cited by examiner

*Primary Examiner* — Yong H Sim
(74) *Attorney, Agent, or Firm* — Kenealy Vaidya LLP

(57) ABSTRACT

A stereographic display apparatus and a vehicle headlight can include an optical modulator including a position sensor and a voltage supply. The position sensor can be configured to detect an inclined angle, and the voltage supply can be configured to apply a voltage to the optical modulator in accordance with the inclined angle output from the position sensor. The optical modulator can refract light at a refraction angle in accordance with the voltage output from the voltage supply. Therefore, when the optical modulator is incorporated into a stereographic display apparatus, the stereographic display apparatus can provide comfortable stereographic displays to viewers, even if it inclines due to hand movement and the like. A vehicle headlight incorporating the optical modulator can also form light distributions in a useful direction for drivers with a simple structure, even when it moves in various directions with reference to a road due to road conditions.

16 Claims, 11 Drawing Sheets

STEREOGRAPHIC DISPLAY APPARATUS AND VEHICLE HEADLIGHT

This application claims the priority benefit under 35 U.S.C. §119 of Japanese Patent Application No. 2012-0136720 filed on Jun. 18, 2012, which is hereby incorporated in its entirety by reference.

BACKGROUND

1. Field

The presently disclosed subject matter relates to stereographic display apparatuses for portable electrical equipments and to vehicle headlights including an automatic level controller. More particularly, the disclosed subject matter relates to stereographic display apparatus, which can provide favorable stereographic displays to viewers regardless of a position thereof, even if they incline due to hand movement and the like, and to vehicle headlights, which can form light distributions in a useful direction for drivers, even when they move in various directions with reference to a road due to road conditions, etc.

2. Description of the Related Art

Stereographic display apparatuses can provide the human eye with a stereographic display by projecting an image having a disparity viewed from each of both eyes on a flat panel screen. Methods for the stereographic display may be divided into either a method using glasses or a method not using glasses. Because the method using glasses may be bothersome to beholders because of the glasses, the method not using glasses has been developed in recent years.

Conventional stereographic display apparatuses not using glasses, for example, are disclosed in Patent Document No. 1 (Japanese Patent Application Laid Open JP2001-66547), Patent Document No. 2 (International Publication No. WO 2004/027492), etc. FIG. 10 is a schematic structure showing a conventional stereographic display unit, which is disclosed in Patent Document No. 2.

The conventional stereographic display unit includes: a light guide 72 having a light-emitting surface 72a and a pair of light incoming surfaces, which face with respect to each other; a pair of light sources 71a and 71b located adjacent a respect one of the light incoming surfaces of the light guide 72, respectively; a prism sheet 73 having a triangular prism array and a cylindrical lens array being located adjacent the light-emitting surface 72a of the light guide 72 so that the triangular prism array faces the light-emitting surface 72a of the light guide 72, the triangular prism array extending in substantially parallel with the light incoming surfaces of the light guide 72, the cylindrical lens array located opposite the triangular prism array of the prism sheet 73, and each one of the cylindrical lens array being located in substantially parallel with a respect one of the triangular prism array; a transmission-type display panel 74 located adjacent the cylindrical lens array of the prism sheet 73; and a synchronous driving means 75 configured to emit light emitted from each of the light sources 71a and 71b from the transmission-type display panel 74 at a angle corresponding to a binocular display in synchronization with a binocular parallax image, which is alternatively displayed from the transmission-type display panel 74.

Thereby, the conventional stereographic display unit can provide the human eye with a stereographic display without glasses by projecting light emitted from each of the light sources 71a and 71b from the transmission-type display panel 74 at the angle corresponding to the binocular display in synchronization with the binocular parallax image, which is alternatively displayed from the transmission-type display panel 74.

However, when a viewer sees the stereographic display depicted on the transmission-type display panel 74 from a rightward direction or from a leftward direction relative to a front of the display panel 74, the conventional stereographic display units such as those disclosed in Patent Documents No. 1 and No. 2 may not easily perform such display because the synchronous driving means 75 freely varies positions of the stereographic display projected on the transmission-type display panel 74 in accordance with an angle of gradient, which is caused by hand movement, etc.

Especially in portable electrical equipments such as a mobile phone, a portable terminal, a portable personal computer, a portable game console, each of the display devices for the portable electrical equipment may not be always located in front of the viewer. Rather position relations between the viewer and the display devices for the portable electrical equipment should be subject to changes in accordance with hand movement, a pose of the viewer, etc. In these cases, it may be difficult for the viewer to enjoy the stereographic display under favorable conditions as usual.

In addition, problems may also be caused in headlight systems when a vehicle headlight includes an automatic level controller. The vehicle headlight including the automatic level controller may emit light in a light-emitting direction thereof so as to maintain at a constant angle with reference to various road surfaces in order to prevent giving a glare type light to an incoming vehicle and the like, even if a vehicle incorporating the above-described headlight suddenly inclines due to road conditions, etc. A conventional vehicle headlight including an automatic level controller, for example, is disclosed in Patent Document No. 3 (Japanese Patent Application Laid Open JP2004-314856).

FIG. 11 is a schematic structure showing a conventional vehicle headlight including an automatic level controller, which is disclosed in Patent Document No. 3. The conventional vehicle headlight includes: a high speed bus (HB) and a low speed bus (LB) used as a vehicular local area network (LAN); a gate way 81 connecting between HB and LB; an human interface 82 connecting to the HB, and also including a switch to turn on and turn off the vehicle headlight; a three dimensional gyro sensor 84 configured to detect angle rates in three dimensional directions of the headlight, and connecting to the LB; an inclined angle table 83 connecting to the gate way 81, and storing relations between inclined angles of a vehicle incorporating the headlight detected by the three dimensional gyro sensor 84 and light-emitting directions of the headlight as a data table; a lighting unit 87 including a supporting frame 71, a first gear 61, a second gear 62 and an actuator 60, the lighting unit 87 attached to the supporting frame 71, in which a first axis of the supporting frame 71 is attached to the first gear 61, and a second axis of the supporting frame 71 is attached to the second gear 62 while the first gear 61 gears the second gear 61, the actuator 60 attached to the first gear 61 and configured to rotate the second gear 62 via the first gear 62; and a controller 5 configured to operate the actuator 60 in accordance with a control signal output from the gate way 81.

As described above, the conventional vehicle headlight includes the gate way 81, which determines a light-emitting direction and an amount of light emitted from the lighting unit 87 in accordance with the inclined angles of the vehicle detected by the gyro sensor 84, and the controller 85 to receive the control signal output from the gate way 81 via the LB. Therefore, the conventional vehicle headlight enables the lighting unit 87 to vary the light-emitting direction and the amount of the light using the gateway 81 and the controller 85 in accordance with the inclined angles of the vehicle detected by the gyro sensor 84.

However, the conventional vehicle headlight varies the light-emitting direction and the amount of the light by moving the lighting unit 87 having a movable structure, and therefore should become a headlight system having a complex structure due to at least to the movable structure for the lighting unit 87. In addition, when the conventional vehicle headlight has been used for a long time under an inhospitable environment, the long inhospitable environment may result in gradual deterioration of the movable structure The above-referenced Patent Documents and additional Patent Documents are listed below and are hereby incorporated with their English specifications and abstracts in their entireties.
1. Patent Document No. 1: Japanese Patent Application Laid Open JP2001-66547
2. Patent Document No. 2: International Publication No. WO2004/027492
3. Patent Document No. 3: Japanese Patent Application Laid Open JP2004-314856
4. Patent Document No. 4: Japanese Patent Application Laid Open JP2011-081985
5. Patent Document No. 5: Japanese Patent Application Laid Open JP2011-145571
6. Patent Document No. 6: Japanese Patent Application Laid Open JP2012-73370
7. Patent Document No. 7: U.S. Patent Publication No. 2012-0235169
8. Patent Document No. 8: U.S. patent application Ser. No. 13/747,247

The disclosed subject matter has been devised to consider the above and other problems, features, and characteristics. Thus, embodiments of the disclosed subject matter can include vehicle headlights including an automatic level controller that can provide favorable light distributions for drivers with a simple structure such that does not include a movable structure as compared with the conventional headlight. The disclosed subject matter can also include a reflector type headlight including the automatic level controller, which can provide giving a glare type light to an oncoming vehicle and the like, even when vehicles incorporating the headlight including the automatic level controller suddenly incline in a direction with reference to a road due to road conditions, etc.

SUMMARY

The presently disclosed subject matter has been devised in view of the above and other problems, features, and characteristics. An aspect of the disclosed subject matter includes stereographic display apparatus, which can provide favorable stereographic displays to viewers regardless of a position thereof, even if they incline due to hand movement and the like, and which can be used as a stereographic display device for portable electrical equipment such as a mobile phone, a portable terminal, a portable personal computer, a portable game console, etc. The disclosed subject matter can also include a small projector type headlight including the automatic level controller for a low beam, which can provide giving a glare type light to an oncoming vehicle and the like, even when vehicles incorporating the headlight incline due to road conditions, etc.

According to an aspect of the disclosed subject matter, a stereographic display apparatus can include: a graphic display device having a polarizer formed in a tabular shape, the polarizer having a polarizing direction, and the graphic display device configured to show stereographic displays via the polarizer; a position sensor located adjacent the graphic display device and being configured to detect an inclined angle in at least one direction with reference to a normal line of the graphic display device; an optical modulator having a liquid crystal layer and a prism array formed in a tabular shape, a first substrate thereof made from a transparent material, an outer surface of the first substrate located on the polarizer of the graphic display device, a second substrate also made from a transparent material and being located so that each of inner surfaces of the first and the second substrates faces with respect to each other via at least the liquid crystal layer, a prism array made from a transparent material, an outer surface of the prism array formed in a substantially plane shape, an inner surface of the prism array including a plurality of fine prisms, each of the fine prisms extending in a first direction, aligning in a second direction substantially perpendicular to the first direction and forming an inclined projection formation in a cross-sectional view from the first direction, the prism array located adjacent the inner surface of the first substrate so that the outer surface of the prism array faces the inner surface of the first substrate, a first electrode disposed on at least one of the inner surface of the first substrate and the inner surface of the prism array, a first orientation film formed on at least one of the inner surface of the outer surface of the prism array and the inner surface of the first electrode, and prescribing an initial orientation state of liquid crystal molecules disposed in the liquid crystal layer, a second electrode disposed on the inner surface of the second substrate, the second orientation film formed on the inner surface of the second electrode and prescribing an initial orientation state of liquid crystal molecules disposed in the liquid crystal layer, and each of the initial orientation states of liquid crystal molecules of the first and the second orientation film being anti-parallel with respect to each other, the liquid crystal layer having a refraction index of extraordinary light and a refraction index of ordinary light of materials included therein, and formed between the first orientation film and the second orientation film, a spacer disposed in the liquid crystal layer and located between the first orientation film and the second orientation film to define a thickness of the liquid crystal layer, and a sealing material disposed between end portions of the first and the second substrates to seal the liquid crystal layer therewith; and a voltage supply configured to receive the inclined angle from the position sensor, wherein the voltage supply applies a voltage to the optical modulator in accordance with the inclined angle output from the position sensor during operation.

In another aspect of the above-described exemplary stereographic display apparatus, the inclined projection formation of the outer surface of the prism array can be formed in a substantially isosceles right triangle shape in a cross-sectional view from the first direction, wherein each of two equal sides of the isosceles right triangle can be substantially parallel to a respect one of the first direction and the second direction of the fine prisms of the prism array in order for the optical modulator to be easily able to control a refraction angle. A refraction index of the prism array can be configured to be substantially the same as a mean value of the refraction index of extraordinary light and the refraction index of ordinary light of the materials included in the liquid crystal layer, and thereby light along with stereographic displays entering into the optical modulator 2 can be refracted in a substantially symmetrical fashion with respect to a normal line of the second substrate 25 of the optical modulator 2. The polarizing direction of the polarizer included in the graphic display device can also be configured to be a substantially same direction as an anti-parallel direction of each of the initial orientation states of liquid crystal molecules of the first and the second orientation films to improve a light-emitting efficiency of the stereographic display apparatus.

In another aspect of the above-described exemplary stereographic display apparatus, the display can include an active matrix LCD panel located underneath the polarizer of the graphic display device can further include: a light guide made from a transparent material, a light-emitting surface thereof formed in a rectangular shape so as to match a shape of a light incoming surface of the graphic display device, a pair of light incoming surfaces be substantially perpendicular to the light-emitting surface thereof and being formed in a substantially plane shape, and a diffusing surface thereof including a plurality of knurls located between the light incoming surfaces, and each of the knurls extending in a direction substantially parallel to the light incoming surfaces thereof and aligning in a direction substantially perpendicular to the light incoming surface thereof; a first light source and a second light source located adjacent a respective one of the pair of light incoming surfaces thereof, respectively; a prism sheet located adjacent the light-emitting surface of the light guide so that a light incoming surface thereof faces the light-emitting surface of the light guide, and located adjacent a light incoming surface of the graphic display device so that the light-emitting surface thereof faces a light incoming surface of the graphic display device; and a controller including an operation unit, an LCD driving circuit and a light source driver, the operation unit configured to output a light source signal to the light source drive and configured to output an LCD driving signal to the LCD driving circuit, the light source driver configured to drive the first light source and the second light source in accordance with the light source signal output from the operation unit, the LCD driving circuit configured to visual displays having a parallax image with respect to right eye and left eye on the active matrix LCD panel in constant synchronization with the first light source and the second light source in accordance with the LCD driving signal output from the operation unit, and thereby the controller being configured to perform the stereographic displays having the same number of pixels as the pixels arranged in the active matrix LCD panel.

Moreover, in another aspect, in the above-described stereographic display apparatus, the voltage supply can be configured to receive the inclined angle from the position sensor via the controller, wherein the voltage supply applies the voltage to the optical modulator in accordance with the inclined angle output from the position sensor via the controller in constant synchronization with the visual displays having the parallax image with respect to right eye and left eye projected on the LCD panel along with the light emitted from the first and the second light sources in order to perform more comfortable stereographic displays.

According to another aspect of the above-described exemplary semiconductor light-emitting device, even if the stereographic display apparatus suddenly inclines in a larger way due to hand movement and the like, the operation unit of the controller can receive the inclined signal from the position sensor, and also can apply an optimum voltage supply to the optical modulator using the voltage supply in synchronization with the visual displays having the parallax image with respect to the right eye and the left eye projected from the stereographic display device along with the light emitted from the first and the second light sources via the light guide, etc. Thus, the disclosed subject matter can provide the stereographic display apparatus, which can perform the various comfortable stereographic displays having the same number of pixels as the colored pixels arranged in the LCD panel used as the stereographic display device for many operators using the controller.

According to another aspect of the disclosed subject matter, a vehicle headlight can include: a projector lens having at least one focus located on an optical axis thereof and including a horizontal direction and a vertical direction with reference to a road, each of the horizontal direction and vertical direction being perpendicular to each other and intersecting with the optical axis thereof; a semiconductor light-emitting device located near or at (i.e., substantially at) the focus of the projector lens so that a light-emitting direction thereof is directed toward the projector lens; a housing attaching the semiconductor light-emitting device and the projector lens thereto; a position sensor located adjacent to the housing and configured to detect an inclined angle in at least one of the horizontal direction and the vertical direction; an optical modulator such as described above located between the projector lens and the semiconductor light-emitting device so that the outer surface of the first substrate of the optical modulator faces the semiconductor light-emitting device; and a voltage supply configured to receive the inclined angle output from the position sensor, wherein the voltage supply applies a voltage to the optical modulator in accordance with the inclined angle output from the position sensor during operation.

According to an aspect of the exemplary vehicle headlight, the voltage supply can vary a light-emitting direction of the headlight using the optical modulator based upon the above-described fundamental structure so that the light-emitting direction is directed toward an optimum position in accordance with an inclined signal output from the position sensor. Thus, the disclosed subject matter can also provide the project type headlight that can project light emitted from the semiconductor light-emitting device in an optimum direction with a small size and a simple structure not including movable parts in accordance with road conditions.

BRIEF DESCRIPTION OF THE DRAWINGS

These and other characteristics and features of the disclosed subject matter will become clear from the following description with reference to the accompanying drawings, wherein.

DETAILED DESCRIPTION OF EXEMPLARY EMBODIMENTS

Figure 1:
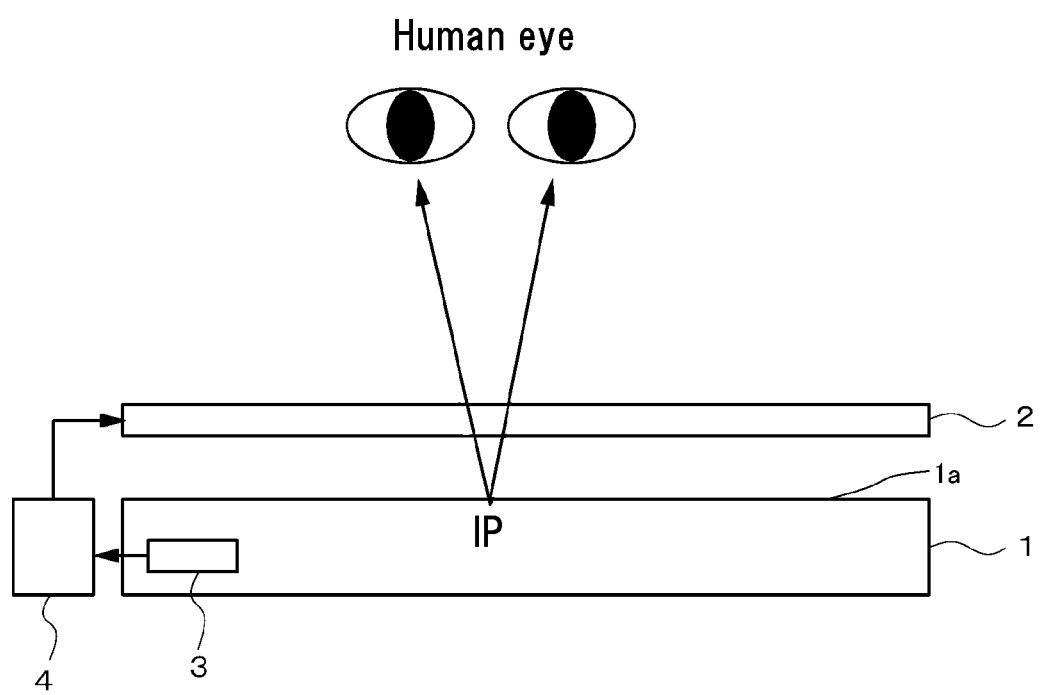
FIG. 1 is a schematic structural view showing an exemplary embodiment of a stereographic display apparatus made in accordance with principles of the disclosed subject matter.

Exemplary embodiments of the disclosed subject matter will now be described in detail with reference to FIG. 1 to 9. FIG. 1 is a schematic structure showing an exemplary embodiment of a stereographic display apparatus made in accordance with principles of the disclosed subject matter. The stereographic display apparatus can be used as a display apparatus, which can enable solid displays for portable electrical equipment such as a mobile phone, a portable terminal, a portable personal computer, a portable game console, a mobile game machine, etc.

The stereographic display apparatus can include: a graphic display device 1 having a polarizer 1a; an optical modulator 2 being located adjacent the polarizer 1a of the graphic display device 1 so as to cover the graphic display device 1; a position sensor 3 (e.g., a gyroscope used as an angular velocity sensor) being located adjacent the graphic display device 1 and configured to detect an inclined angle with reference to a normal line of the graphic display device 1; and a voltage supply 4 configured to apply a voltage to the optical modulation 2 in accordance with the inclined angle with reference to the normal line of the graphic display device 1, which is detected by the position sensor 3.

As the position sensor 3, a gyroscope, which detects the angular velocity by detecting an inertial force based upon Coriolis force developed when an object moves on a rotating reference frame, can be used for the stereographic display device. The stereographic display apparatus of the disclosed subject matter may include only one gyroscope as the position sensor 3 because it is used to detect the inclined angle in one direction of the stereographic display apparatus when the stereographic display apparatus basically inclines in the one direction with respect to a right and left thereof.

When the stereographic display apparatus is used while it is inclined in a different direction from the rightward and leftward direction of the stereographic display apparatus, the position sensor 3 can be composed of a plurality of gyroscopes so as to be able to detect inclined angles in a plurality of directions of the stereographic display apparatus, and also can be composed of a gyroscope such that can detect angular velocities in the plurality of directions such as two axes and three axes. In addition, the position sensor 3 can include the gyroscope to detect the angular velocity and a geomagnetic sensor, which can detect a direction of a magnetic field for detecting a position of the stereographic display apparatus.

Figure 2:
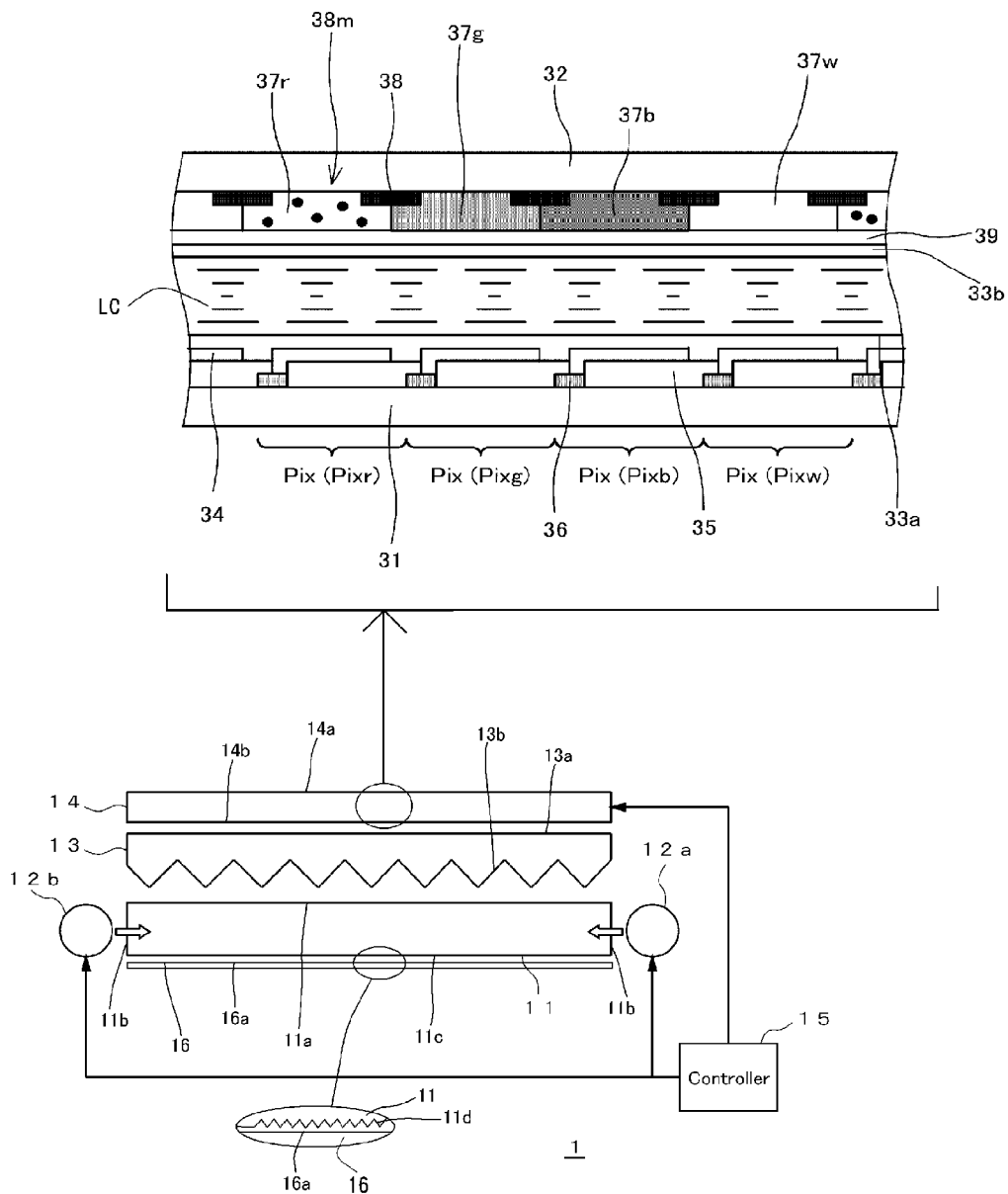
FIG. 2 is a schematic structural view depicting an exemplary frame format of a graphic display device, which is used for the stereographic display apparatus shown in FIG. 1.

FIG. 2 is a schematic structural view depicting an exemplary frame format of the graphic display device 1, which is used for the stereographic display apparatus shown in FIG. 1.

The graphic display device 1 can include: a light guide 11 having a light-emitting surface 11a, a diffusing surface 11c and a pair of light incoming surfaces 11b; a first light source 12a and a second light source 12b located adjacent a respective one of the pair of light incoming surfaces 11b of the light guide 11, respectively; a prism sheet 13 having a light-emitting surface 13a and a light incoming surface 13b being located adjacent the light-emitting surface 11a of the light guide 11 so that the light incoming surface 13b of the prism sheet 13 faces the light-emitting surface 11a of the light guide 11; a liquid crystal display (LCD) panel 14 having a light-emitting surface 14a and a light incoming surface 14b located adjacent the light-emitting surface 13a of the prism sheet 13 so that the light incoming surface 14b of the LCD panel 14 faces the light-emitting surface 13a of the prism sheet 13; and a controller 15 configured to driving the first and the second light sources 12a and 12b and the LCD panel 14, and configure to perform various stereo displays from the light-emitting surface 14a of the LCD panel 14 using light emitted from the first and the second light sources 12a and 12b via the light guide 11 and the prism sheet 13.

The light guide 11 can be made from a transparent material and the light-emitting surface 11a of the light guide 11 can be formed in a rectangular shape in order to match the LCD panel 14 to a shape of the light-emitting surface 14a of the LCD panel 14. A refractive index of the light guide 11 can be around within a range of approximately 1.49 to 1.58, and therefore the transparent resin such as an acrylic resin, a polycarbonate resin and the like can be used as to form the light guide 11. The light-emitting surface 11a of the light guide 11 can operate as a light generation surface for the light guide 11, and the light incoming surfaces 11b of the light guide 11 can operate as incoming surfaces for entering light entering into the light guide 11.

The light entering through the light incoming surfaces 11b can be emitted from the light guide 11 through the light-emitting surface 11a of the light guide 11. The light incoming surfaces 11b can be substantially perpendicular to the light-emitting surface 11a for emitting light from the light guide 11 and can be formed in a planar shape. The diffusing surface 11c of the light guide 11 can include a function for diffusing an incoming light that enters into the light guide 11 from the incoming surfaces 11b and for emitting to cause the diffused light to be emitted from the light-emitting surface 11a. The diffusing surface 11c can be located adjacent a top surface 16a of a reflecting sheet 16, which can reflect an incoming light transmitted from the diffusing surface 11c thereon, and the reflective light can enter into the light guide 11 via the diffusing surface 11c of the light guide 11 with the reflecting sheet 16.

The diffusing surface 11c of the light guide 11 can include a plurality of knurls 11d that is located between the pair of light incoming surfaces 11b so as to extend in a direction substantially parallel to the light incoming surfaces 11b as a uniform light-emitting treatment. The exemplary embodiment of the disclosed subject matter can display the stereographic displays with light emitted from the light-emitting surface 14a of the LCD panel 14 via the prism sheet 13 after diffusing the light that reaches the diffusing surface 11c including the knurls 11d in the light guide 11 and the light that enters into the light guide 11 by reflecting on the top surface 16a of the reflecting sheet 16.

The reflecting sheet 16 can be made from multiple layers by forming a metallic layer having high reflectivity such as a silver, an aluminum and the like on a polyester film using an evaporation method, an sputtering method, etc. A thin resin (e.g. ESR made by 3M Limited) can also be formed on the polyester film. The prism sheet 13 can be configured with or made from a transparent material and can be configured to orient the diffused light transmitted from the light guide 11 in a predetermined direction.

Accordingly, the prism sheet 13 can be composed of at least one of a prism sheet including at least one of the triangular prisms such that each of the triangular prisms is located at a regular interval in a respective one of a direction substantially perpendicular to the light incoming surfaces 11b of the light guide 11 and a direction substantially parallel to the light incoming surfaces 11b of the light guide 11 and extends in another respective one of the direction substantially perpendicular to the light incoming surfaces 11b of the light guide 11 and the direction substantially parallel to the light incoming surfaces 11b of the light guide 11 on at least one of the light-emitting surface 13a and the light incoming surface 13b thereof, respectively.

Thereby, the prism sheet 13 can be configured to orient the light distribution toward the light incoming surface 14b of the LCD panel 14. The LCD panel 14 can be configured to provide a visual display for right eye and another visual display for left eye of human eye, as shown in FIG. 1. The controller 15 can display the visual displays having a parallax image with respect to the right eye and the left eye from the light-emitting surface 14a of the LCD panel 14 in constant synchronization with the first and the light sources 12a and 12b and the LCD panel 14, and thereby the stereographic display apparatus can perform the various stereographic displays having the same number of pixels as the pixels arranged in the LCD panel 14.

As an exemplary LCD panel, the LCD panel 14 can include: a first substrate 31 and a second substrate 32, which are composed of a transparent material such as a glass and the like, and are arranged so as to face each other through a liquid crystal layer LC and the like; pixel electrodes 34, which are composed of a transparent conductive film (ITO film, etc.) and are formed in respective pixels Pix; thin film transistors (TFTs) 36 each being electrically connected to a respective one of the pixel electrodes 34, and being located on a lower layer side than the pixel electrodes 34 via a respective one of insulation films 35; and a first orientation film 33a located on an upper layer side (the liquid crystal layer side) of the pixels electrodes 34, and prescribing an initial orientation state of liquid crystal molecules formed in the liquid crystal layer LC that is formed so as to cover the pixel electrodes 34.

In addition, the LCD panel 14 can include: light shielding films 38 located on an inner surface of the second substrate 32 facing the first substrate 31, and being formed as a grid-like black matrix so that openings 38m thereof correspond to respective positions of the pixel electrodes 34; color filters 37r, 37g, 37b and 37w being located on an upper layer side of the light shielding films 38, formed for the respective pixels Pix (Pixr), Pix (Pixg), Pix (Pixb) and Pix (Pixw) as a red color filter of red component, a green color filter of green component, a blue color filter of blue component and a white color filter of white component, respectively, and arranged in that order in successive four pixels Pix disposed in a row, and theses four color filters are repeated every four pixels; and a second orientation film 33b located on an upper layer side of a common electrode 39, and prescribing an initial orientation state of liquid crystal molecules formed in the liquid crystal layer LC, as show in a partial close-up view depicted in FIG. 2.

Figure 3A:
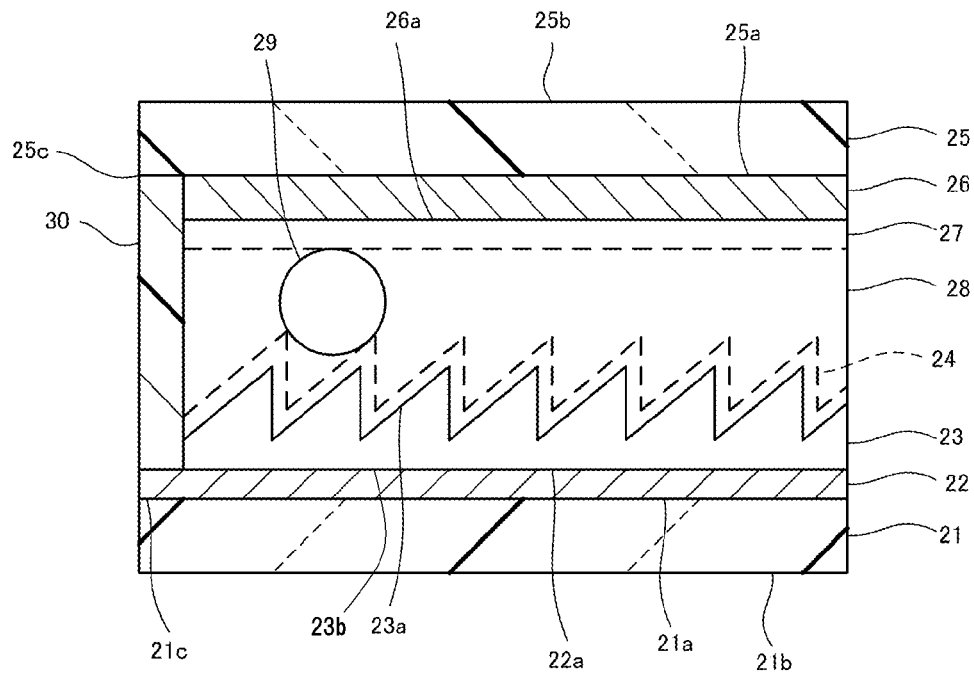
FIG. 3a is a schematic partial structural view depicting a first exemplary frame format of an optical modulator, which is used for the stereographic display apparatus shown in FIG. 1.

FIG. 3a is a schematic structural view depicting a first exemplary frame format of the optical modulator 2, which is used for the stereographic display apparatus shown in FIG. 1. The optical modulator 2 can include: a first substrate 21 and a second substrate 25, which are composed of a transparent material such as a glass, a plastic and the like, and are arranged so as to face with respect to each other via a liquid crystal layer 28, etc.; a first electrode 22 having an inner surface 22a disposed on an inner surface 21a of the first substrate 21, which is located in a direction toward the second substrate 25; a prism array 23 having an inner surface 23a being located on the inner surface 22a of the first substrate 22, which is located in a direction toward the second substrate 25; and a first orientation film 24 located on the inner surface 23a of the prism array 23, and prescribing an initial orientation state of liquid crystal molecules disposed in the liquid crystal layer 28 that is formed so as to cover the prism array 23.

In addition, the optical modulator 2 can also include: a second electrode 26 having an inner surface 26a disposed on an inner surface 25a of the second substrate 25, which is located in a direction toward the first substrate 21; a second orientation film 27 located on the inner surface 26a of the second electrode 26, and prescribing an initial orientation state of liquid crystal molecules disposed in the liquid crystal layer 28 that is formed so as to cover the inner surface 26a of the second electrode 26; a spacer 29 located between the first orientation film 24 and the second orientation film 27; and a sealing material 30 disposed between an end portion 21c of the first substrate 21 and an end portion 25c of the second substrate 25 so as to cover a whole circumference between the end portion 21c of the first substrate 21 and the end portion 25c of the second substrate 25, and preventing the liquid crystal layer 28 from leaking in an outward direction of the optical modulator 2.

The optical modulator 2 can be formed in a thin tubular shape, and also can be a substantially transparent device. The optical modulator 2 can control light emitted from the light-emitting surface 14a of the LCD panel 14 along with the various stereographic displays depicted from the LCD panel 14 in accordance with a driving signal output from the voltage supply 4, and therefore had better be located on the light-emitting surface 14a of the LCD panel 14 while contacting with the light-emitting surface 14a of the LCD panel 14 in order to provide conspicuous stereographic displays.

The optical modulator 2 of the disclosed subject matter can include the liquid crystal layer 28. However, it is unnecessary for the optical modulator 2 to locate a polarizer unlike a general LCD device. Accordingly, the optical modulator 2 can maintain at a high transparence. Specifically, the optical modulator 2 may maintain at a transmission of more than 90 percents, and when an antireflection treatment is formed on an outer surface 21b of the first substrate 21 and an outer surface 25b of the second substrate 25, the optical modulator 2 may maintain at a transmission of more than 95 percents.

In the optical modulator 2, a large amount of the spacer 29, which is formed in a particulate shape, can be disposed between the first orientation film 24 and the second orientation film 27 along with the liquid crystal layer 28 so that a pace between the first orientation film 24 and the second orientation film 27, that is a thickness of the liquid crystal layer 28, can keep a substantially uniformity. The spacer 29 can be formed from an organic material such as a glass (e.g. Barium Titanium series glass) and the like, and also can be an inorganic material such as a resin and the like if the materials have a prescribed particle size with a high degree of accuracy. For example, a particle of oxide silicon such as silicon dioxide ($SiO_2$) can be used as the spacer 29.

Each of the first electrode 22 disposed on the first substrate 21 and the second electrode 26 disposed on the second substrate 25 can be formed by a transparent film such as indium tin oxide (ITO) and the like, and also can be formed wholly on the inner surface 21a of the first substrate 21 and the inner surface 25a of the second substrate 25, respectively. Each of the first electrode 22 and the second electrode 26 can also be formed by a patterning method.

In addition, a case where the first electrode 22 is disposed between the inner surface 21a of the first substrate 21 and the prism array 23 is explained in the first exemplary embodiment of the optical modulator 2, as described above. However, the first electrode 22 may also be disposed between the first orientation film 24 and the prism array 23, as shown in FIG. 3b as a second exemplary embodiment of the optical modulator 2.

Figure 3B:
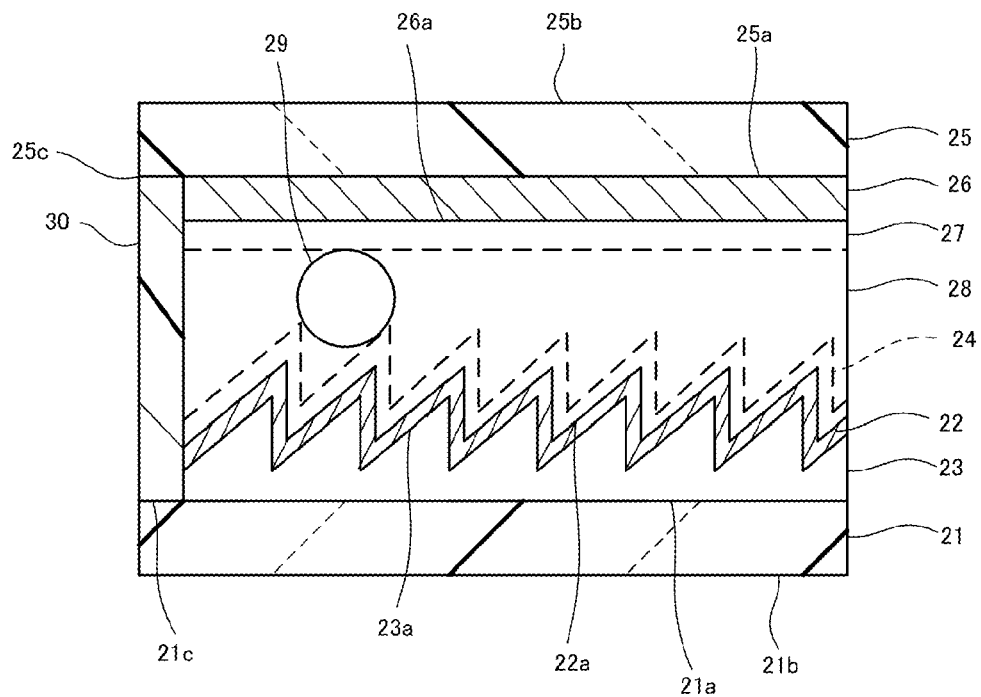
FIG. 3b is a schematic partial structural view depicting a second exemplary frame format of the optical modulator.
Figure 4:
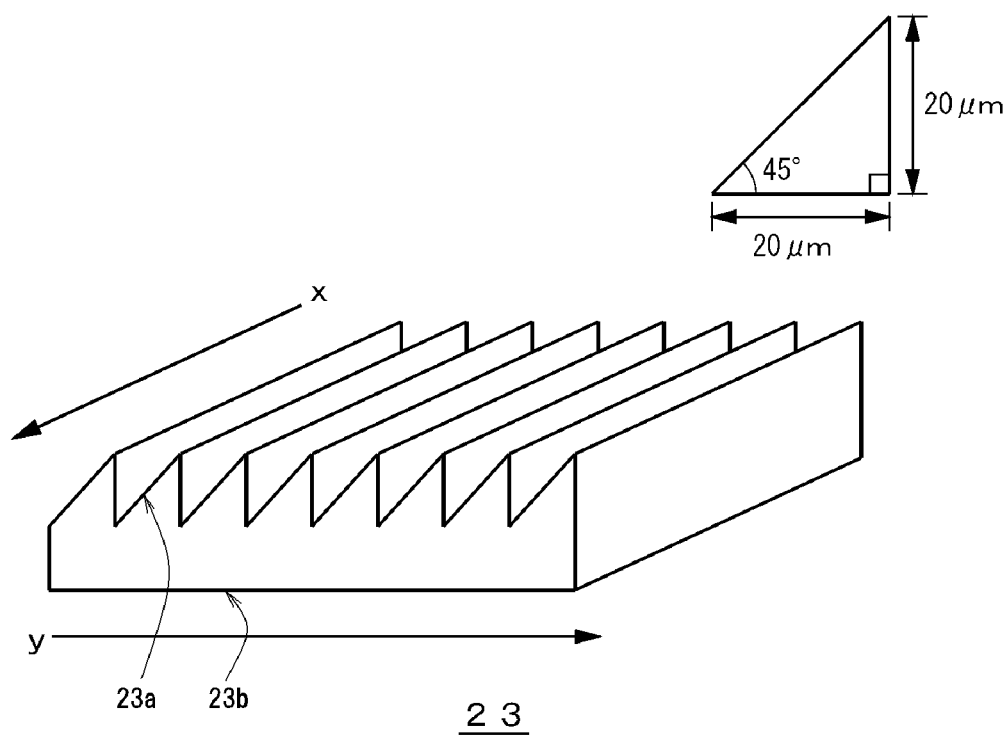
FIG. 4 is a perspective enlarged structural view showing an exemplary frame format of a prism array, which is used for the optical modulator shown in FIG. 3.

FIG. 4 is a perspective enlarged structural view showing an exemplary frame format of the prism array 23, which is used for the optical modulator 2 shown in FIG. 3a and FIG. 3b. The prism array 23 can include a plurality of fine prisms such as an inclined projection formation, in which the fine prisms extend in a first direction x so as to align in a second direction y perpendicular to the first direction x. The prism array 23 of the disclosed subject matter can include a plurality of isosceles right triangles in a cross-sectional view from the first direction x with reference to the second direction y thereof.

For example, each of basic angles of the isosceles right triangles is 45 degrees and 90 degrees with respect to an apex angle of 45 degrees, respectively. Each of pitches between the adjacent apex angles of the prism array 23 can be approximately 20 micro meters, and therefore each of heights of the prism array 23 can also be approximately 20 micro meters due to the isosceles right triangle. The prism array 23 can be made by casting a resin material having a high heat resistance and a high adhesion.

In the above-describe exemplary embodiments, as each of the first orientation film 24 located on at least one of the inner surface 23a of the prism array 23 in the first embodiment and the inner surface 22a of the first electrode 22 in the second embodiment of the optical modulator 2 and the second orientation film 27 located on the inner surface 26a of the second electrode 26, a horizontal orientational film, which prescribes a horizontal orientational state for the initial orientation state (under no applied voltage) of liquid crystal molecules disposed in the liquid crystal layer 28, is used. In these cases, each of the first orientation film 24 and the second orientation film 27 can be carried out by a prescribed surface treatment such as a rubbing method, a photo-alignment method, etc.

In addition, as the liquid crystal layer 28, a nematic liquid material having a positive dielectric constant anisotropy ($\Delta\in$) is used. In this case, the liquid crystal molecules disposed in the liquid crystal layer 28 can be oriented in the horizontal direction at a pretilt angle with respect to the first substrate 21 and the second substrate 25 under no applied voltage. A circumference of the liquid crystal layer 28 can be sealed by the sealing material 30.

Here, an operating principle of the optical modulator 2 will now be described. An alignment of the liquid crystal molecules disposed in the liquid crystal layer 28 can be varied by applying a voltage (generally alternating-current voltage) between the first electrode 22 and the second electrode 26, and thereby an effective refraction index of the liquid crystal layer 28 can also vary. Accordingly, a refraction angle of light passing through an interface between the liquid crystal layer 28 and the prism array 23, which includes the plurality of fine prisms that extend in the first direction x so as to align in the second direction y and that are formed on the light-emitting surface 23a of the prism array 23, can vary in accordance with Snell's law.

Therefore, when light entering from the LCD panel 14 into the optical modulator 2 passes through the interface between the liquid crystal layer 28 and the prism array 23, the refraction angle of the light can be suitably changed by properly adjusting the voltage applied between the first electrode 22 and the second electrode 26. The refraction angle can be within a range of approximately several degrees to 20 degrees according to a shape of the prism array 23, an anisotropy of refraction index of the liquid crystal layer 28, etc. Thus, the stereographic display apparatus can vary positions of the various stereographic displays projected from the polarizer 1a of the graphic display device 1 via the optical modulator 2 by properly adjusting the voltage applied between the first electrode 22 and the second electrode 26.

A voltage applied to the liquid crystal layer 28 can be approximately several voltages in the first structure of the optical modular 2 shown in FIG. 3a. When the first electrode 22 is located between the prism array 23 and the first orientation film 24 in the second structure as shown in FIG. 3b, the stereographic display apparatus can enable the voltage supply 4 to reduce the voltage applied to the liquid crystal layer 28 because the liquid crystal layer 28 can be applied directly between the first electrode 22 and the second electrode 26 without via the prism array 23.

In addition, a threshold voltage of the liquid crystal layer 28 may hardly depend on the thickness of the liquid crystal layer 28 because the oriental treatment is aligned as an anti-parallel as described later with reference to FIG. 5, although the thickness of the liquid crystal layer 28 is different according to a position of the prism array 23. Accordingly, a characteristic that is a little difference in the refraction index of the interface between the prism array 23 and the liquid crystal layer 28 such that it depends upon the position of the prism array 23, can also be a part of the reason for reducing the voltage applied to the liquid crystal layer 28 when the liquid crystal layer 28 is applied directly between the first electrode 22 and the second electrode 26 and not via the prism array 23.

Next, each refraction index (especially favorable refraction index) of the materials of the liquid crystal layer 28 and the prism array 23 will now be described. In the stereographic display apparatus of the disclosed subject matter, the refraction index of the material of the prism array 23 can configured to be substantially same as (or near to) a mean value (ne+no)/2, in which "ne" means a refraction index of extraordinary light of the liquid crystal material and "no" means a refraction index of ordinary light, in order to refract the light along with the stereographic displays entered into the optical modulator 2 at a substantially even angle in a rightward and leftward direction of the stereographic display apparatus with reference to a normal line of the second substrate 25 of the optical modulator 2.

More specifically, an ultraviolet curable resin of polyurethane series having a refraction index of approximately 1.6 can be used as the material for the prism array 23. In this case, a material having an anisotropy of refraction index $\Delta n$ of approximately 0.2, a refraction index of extraordinary light "ne" of 1.7 and a refraction index of ordinary light "no" of 1.5 can be used as the material for the liquid crystal layer 28. When an ultraviolet curable resin of special acrylates including two benzene rings having a refraction index of approximately 1.577 can be used as the material for the prism array 23, a material having an anisotropy of refraction index $\Delta n$ of approximately 0.13, a refraction index of extraordinary light "ne" of 1.64 and a refraction index of ordinary light "no" of 1.51 can be used as the material for the liquid crystal layer 28.

When each of the liquid crystal layer 28 and the prism array 23 can satisfy the above-described terms, the light along with the stereographic displays entering into the optical modulator 2 can be refracted in a substantially symmetrical fashion with respect to the normal line of the second substrate 25 of the optical modulator 2 in each of cases where the voltage supply 4 applies a maximum voltage (saturation voltage) to the liquid crystal layer 28 and where the voltage supply 4 does not apply a voltage to the liquid crystal layer 28.

Figure 5:
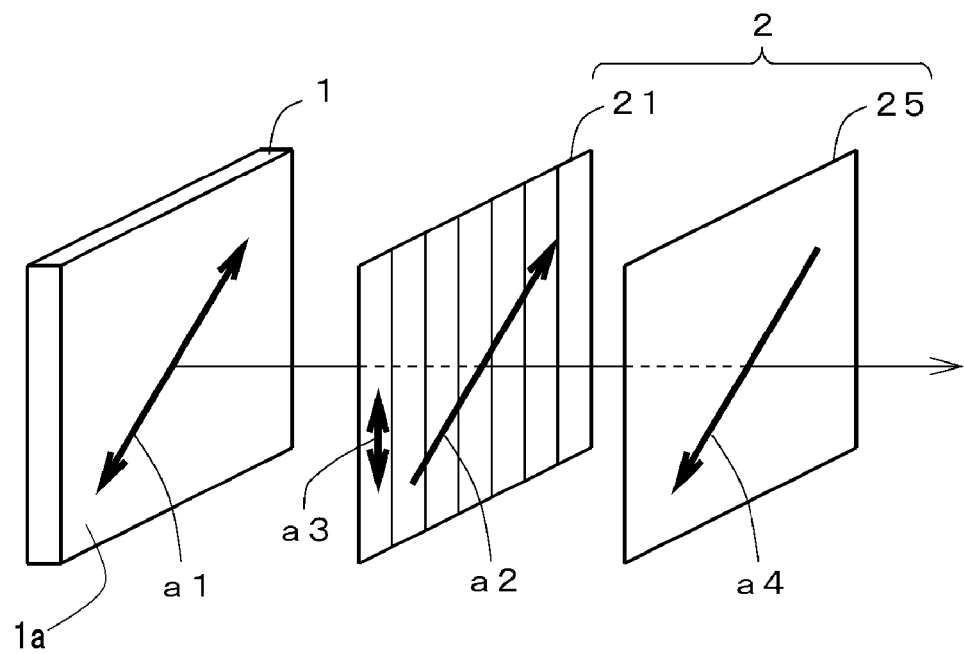
FIG. 5 is an explanatory view depicting an exemplary relationship between a polarizing direction of light emitted from a graphic display device of the stereographic display apparatus and an orientation of orientational treatment in the optical modulators shown in FIG. 3a and FIG. 3b.

FIG. 5 is an explanatory view depicting an exemplary relation between a polarizing direction of light emitted from the graphic display device 1 and the orientation of orientational treatment in the optical modulators 2 shown in FIG. 3a and FIG. 3b. The graphic display device 1 can be the LCD panel 14 including at least one of the polarizer 1a, which is located adjacent the light-emitting surface 14a of the LCD panel 14 shown in FIG. 2. Another polarizer can be located between the light incoming surface 14b of the LCD panel 14 and the light-emitting surface 13a of the prism array 13. After light emitted from the light-emitting surface 14a of the LCD panel 14 passes through the polarizer 1a, the light can be polarized in a direction of an arrow a1 as shown in FIG. 5.

In the exemplary embodiment shown in FIG. 5, the light passing through the polarizer 1a can be polarized in a direction of 45 degrees with reference to the rightward and leftward direction of the graphic display device 1. Meanwhile, the first substrate 21 can be located adjacent the polarizer 1a of the graphic display device 1 so that an orientation of orientational treatment a2 formed on the first orientation film 24 can become substantially parallel to the polarizing direction a1.

The orientation of orientational treatment a2 can be directed in a direction of approximately 45 degrees with reference to the first direction x of the prism array 23, which is the extending direction a3 of the plurality of fine prisms as shown in FIG. 5. The second substrate 25 can be located so as to face the first substrate 21 with respect to each other via the liquid crystal layer 28 and the like so that an orientation of orientational treatment a4 formed on the second orientation film 27 can become substantially anti-parallel to the orientation of orientational treatment a2 of the first orientation film 24.

A merit to form the orientation of orientational treatment a2 formed on the first orientation film 24 in substantially parallel to the polarizing direction a1 of the light emitted from the polarizer 1a of the graphic display device 1 will now be described. Because the liquid crystal molecules disposed in the liquid crystal layer 28 are generally formed in a slender shape, polarized light having a direction (long axis direction of the liquid crystal molecules) can be easily refracted, however, polarized light having another direction may be easy to pass through the polarizer 1a of the graphic display device 1 without any refraction.

Accordingly, by locating the first substrate 21 adjacent the polarizer 1a of the graphic display device 1 so that the orientation of orientational treatment a2 formed on the first orientation film 24 becomes substantially parallel to the polarizing direction a1, all or most light components emitted from the polarizer 1a can be refracted in principle. Thereby, the above-described structure of the disclosed subject matter can also result in the stereographic display apparatus having a high light-efficiency.

On other hand, when the first substrate 21 is located adjacent the polarizer 1a of the graphic display device 1 so that the orientation of orientational treatment a2 formed on the first orientation film 24 becomes 45 degrees relative to the polarizing direction a1, approximately half of the polarized light emitted from the polarizer 1a may be refracted, however, another half of the polarized light may not be easily controlled by the optical modulator 2 using the voltage supply 4 in principle. Additionally, when the first substrate 21 is located adjacent to the polarizer 1a so that the orientation of orientational treatment a2 is perpendicular to the polarizing direction a1, all or most of the polarized light emitted from the polarizer 1a may not be controlled by the optical modulator 2 using the voltage supply 4.

Therefore, when the first substrate 21 is located adjacent the polarizer 1a of the graphic display device 1 so that the orientation of orientational treatment a2 formed on the first orientation film 24 becomes substantially parallel to the polarizing direction a1, because all or most of the light components emitted from the polarizer 1a can be refracted in principle, the disclosed subject matter can provide the stereographic display apparatus having a high light-efficiency.

In this case, with respect to the extending direction a3 of the prism array 23 shown in FIG. 5, a locating direction of the prism array 23 may be required to be considered in point of a moving direction of the stereographic displays projected from the optical modulator 2. However, even if the locating direction of prism array 23 varies, the stereographic display apparatus can enable the optical modulator 2 to move the stereographic displays depicted by the graphic display device 1 using the voltage supply 4.

In the above-described exemplary embodiments, a case where the orientation of orientational treatment a2 is directed in the direction of approximately 45 degrees with reference to the extending direction a3 of the prism array 23 is described. However, the disclosed subject matter cannot be limited to the above-described structure. One reason why the orientation of orientational treatment a2 is directed in the direction of approximately 45 degrees with reference to the extending direction a3 of the prism array 23 is that the orientation of orientational treatment a2 had better become approximately 45 degrees with reference to the extending direction a3 of the prism array 23 to move the stereographic displays in a rightward, leftward, upward and downward direction of the stereographic display apparatus.

That is because the stereographic displays depicted from the graphic display device 1 are polarized in the direction of approximately 45 degrees. If the stereographic displays depicted from the graphic display device 1 move in the direction of 45 degrees, the orientation of orientational treatment a2 may be directed in either one of a direction substantially perpendicular to the extending direction a3 of the prism array 23 or a direction substantially parallel to the extending a3 of the prism array 23.

An exemplary method for manufacturing the above-described optical modulator 2 is disclosed in Patent Document No. 4 (Japanese Patent Application Laid Open JP2011-081985) by a first author (Mr. Tokoo) of inventors of this disclosed subject matter. Accordingly, descriptions of the manufacturing method for the optical modulator 2 are abbreviated by incorporating Patent Document No. 4 into the presently disclosed subject matter. Additionally, an optical modulator using cholesteric blue phase and a high speed optical modulator are disclosed in Patent Document No. 5 (Japanese Patent Application Laid Open JP2011-145571) and Patent Document No. 6 (Japanese Patent Application Laid Open JP2012-73370) by the inventor of this disclosed subject matter, respectively. Technologies disclosed in Patent Documents No. 5 and No. 6 can also be used for the stereographic display apparatus of the disclosed subject matter as needed.

As described above, the light along with the stereographic displays entering into the optical modulator 2 can be refracted in the substantially symmetrical fashion with respect to the normal line of the second substrate 25 of the optical modulator 2 in each of cases where the voltage supply 4 applies a maximum voltage (saturation voltage) to the liquid crystal layer 28 and where the voltage supply 4 does not apply a voltage to the liquid crystal layer 28. Thus, the stereographic display apparatus can enable the graphic display device 1 to move the various stereographic displays in a direction of a viewer in accordance with a movement thereof using the optical modulator 2, the position sensor 3 and the voltage supply 4.

Figure 6A:
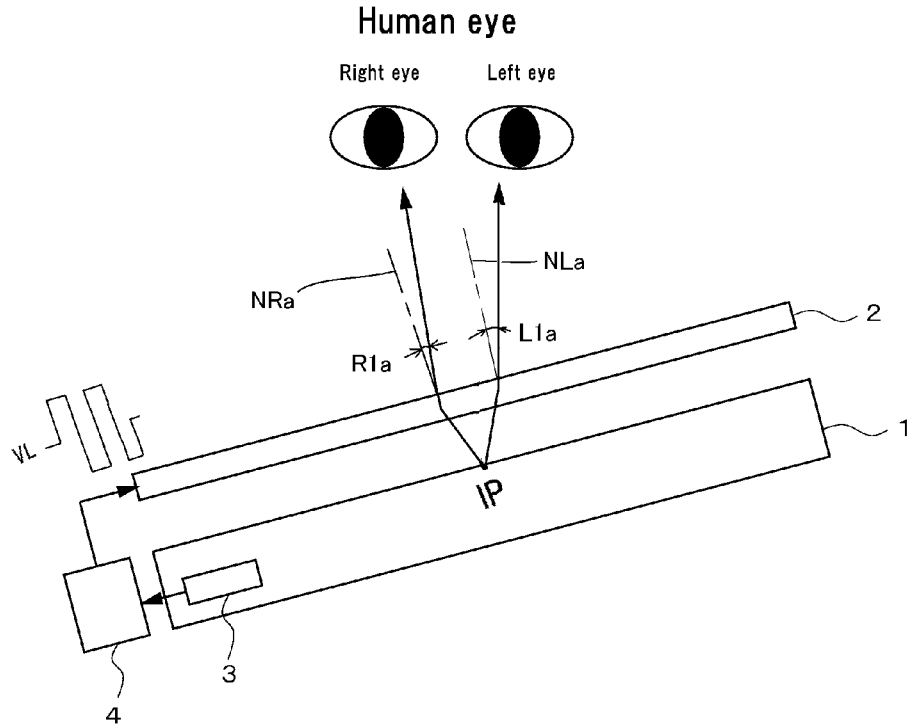
FIGS. 6a and 6b are explanatory views showing exemplary operating states for the stereographic display apparatus shown in FIG. 1 when the stereographic display apparatus inclines in a rightward direction thereof and in a leftward direction thereof, respectively.
Figure 6B:
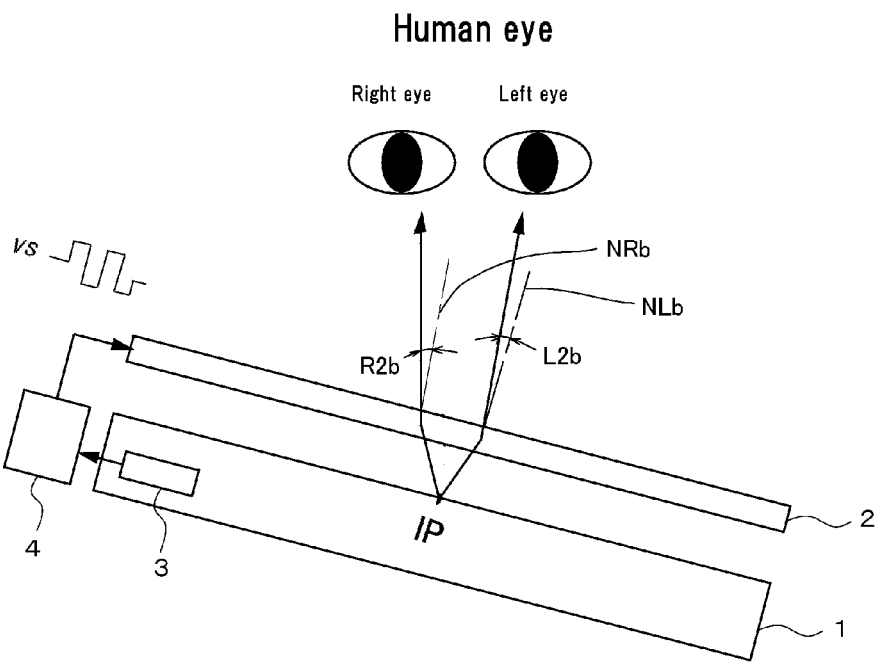

FIGS. 6a and 6b are explanatory views showing exemplary operating states for the stereographic display apparatus shown in FIG. 1 when the stereographic display apparatus inclines in a rightward direction thereof and in a leftward direction thereof, respectively. When the stereographic display apparatus inclines in the rightward direction thereof as shown in FIG. 6a, light along with a stereographic display for right eye can be refracted at an angle of R1a with respect to a normal line NRa of the optical modulator 2 by applying a relative high voltage VL to the liquid crystal layer 28 of the optical modulator 2.

In this case, light along with a stereographic display for left eye can be refracted at an angle of L1a with respect to a normal line NLa of the optical modulator 2 by applying the relative large voltage VL to the liquid crystal layer 28 of the optical modulator 2. Therefore, the viewer can comfortably enjoy a stereographic display IP shown in FIG. 1 at a substantially same position as the position of FIG. 1 even if the stereographic display apparatus inclines in the rightward direction thereof.

When the stereographic display apparatus inclines in the leftward direction thereof as shown in FIG. 6b, light along with a stereographic display for right eye can be refracted at an angle of R2b with respect to a normal line NRb of the optical modulator 2 by applying a relative low voltage VS to the liquid crystal layer 28 of the optical modulator 2, and also light along with a stereographic display for left eye can be refracted at an angle of L2b with respect to a normal line NLb of the optical modulator 2 by applying the relative low voltage VS to the liquid crystal layer 28 of the optical modulator 2. Therefore, even if the stereographic display apparatus inclines in the leftward direction thereof, the viewer can also comfortably enjoy the stereographic display IP shown in FIG. 1 at the substantially same position as the position of FIG. 1.

The above-described high voltage VL output from the voltage supply 4 can be replaced with the low voltage VS by changing the first direction x of the prism array 23 of the optical modulator 2, the orientation of orientational treatment a2 formed on the first orientation film 24 of the optical modulator 2, etc. Accordingly, the voltage supply 4 cannot be limited to the above-described applying methods. In the operating method described above, especially when each of the refraction angles R1a for right eye and the refraction angle L1a for left eye is relatively similar and when each of the refraction angles R2b for right eye and the refraction angle L2b for left eye is relatively similar, the stereographic display apparatus can perform comfortable stereographic displays for many viewers.

Figure 7:
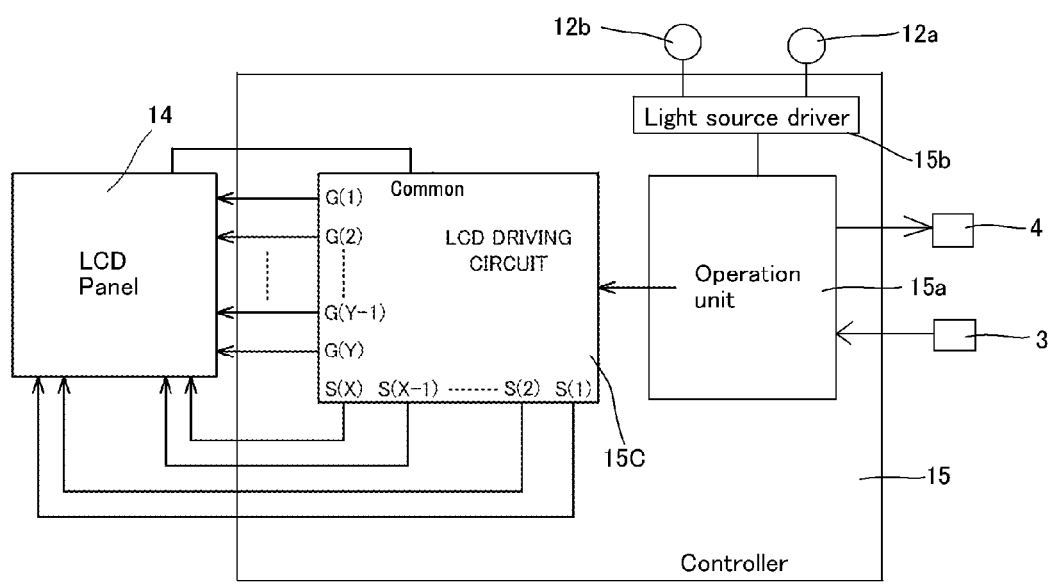
FIG. 7 is a schematic block diagram showing a controller for the graphic display device shown in FIG. 2, and also which can be used for the stereographic display apparatus shown in FIG. 1.

FIG. 7 is a schematic block diagram showing a controller for the graphic display device shown in FIG. 2, and also which can be used for the stereographic display apparatus shown in FIG. 1. The controller 15 can display the visual displays having the parallax image with respect to the right eye and the left eye on the LCD panel 14 in constant synchronization with the first and the light sources 12a and 12b and the LCD panel 14, and thereby the stereographic display apparatus can perform the various colored stereographic displays having the same number of pixels as the colored pixels arranged in the LCD panel 14 as shown in FIG. 2.

More specifically, the LCD panel 14 can arrange the plurality of pixels Pix, which are arranged in a matrix, a plurality of scanning lines G (Y) for sequentially scanning the respective pixels Pix every prescribed number, and a plurality of data lines S (X) for providing display signal voltages to be written onto the respective pixels Pix. Each of the pixels Pix is provided with: the TFT 36, which has a gate electrode connected to the scanning line G (Y) and a drain electrode connected to the data line S (X); the pixel electrode 34 being connected to a source electrode of the TFT 36; and an auxiliary capacitor for storing charges to maintain, at a prescribed voltage differential, the voltage differential between the pixel electrode 34 and the common electrode 39 that is formed on the second substrate 32.

Here, the common electrode 39 can be configured to assume a common opposite voltage for all or most of the pixels when provided with a common signal. The data lines S (X) and the scanning lines G (Y) can be arranged so as to intersect with respect to each other. Each pixel Pix can be connected to one of the data lines S (X) and to one of the scanning lines G (Y) at a location adjacent to their intersection through the TFT 36. Further, for every two pixels, the pixels, which are adjacent to each other, can also be connected so as to share one data line S (X). In addition, the respective TFTs 36 for these two pixels Pix can also be connected to the different scanning lines G (Y), respectively.

Therefore, the controller 15 can enable an operating unit 15a to display the visual displays having the parallax image with respect to the right eye and the left eye on the LCD panel 14 via an LCD driving circuit 15c in constant synchronization with the first and the second light sources 12a and 12b using a light source driver 15b. The stereographic display apparatus can perform the various colored stereographic displays having the same number of pixels as the colored pixels arranged in the LCD panel 14 using the controller 15.

When the stereographic display apparatuses incorporated into the portable electrical equipments suddenly inclines in a larger way due to hand movement, etc., the operation unit 15 of the controller 15 can receive an inclined signal from the position sensor 3. In this case, the operation unit 15 can control the voltage supply 4 for the optical modulator 2 in synchronization with the visual displays having the parallax image with respect to the right eye and the left eye projected from the LCD panel 14 along with the first and the light sources 12a and 12b.

Thus, the stereographic display apparatus of the disclosed subject matter can perform the various comfortable colored stereographic displays having the same number of pixels as the colored pixels arranged in the LCD panel 14 for many operators using the controller 15, even if each of the refraction angles R1a for right eye and the refraction angle L1a for left eye is widely different and/or even if each of the refraction angles R2b for right eye and the refraction angle L2b for left eye widely varies.

Figure 8:
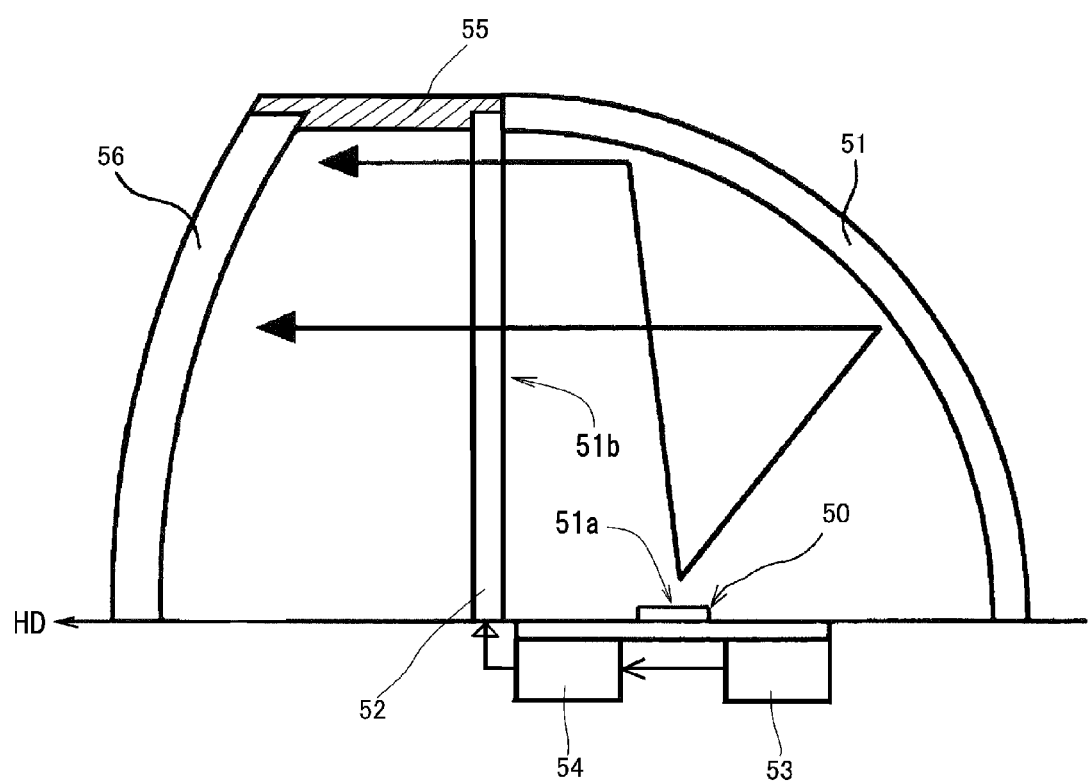
FIG. 8 is a side cross-sectional view showing a first exemplary embodiment of a vehicle headlight made in accordance with principles of the disclosed subject matter.
Figure 9:
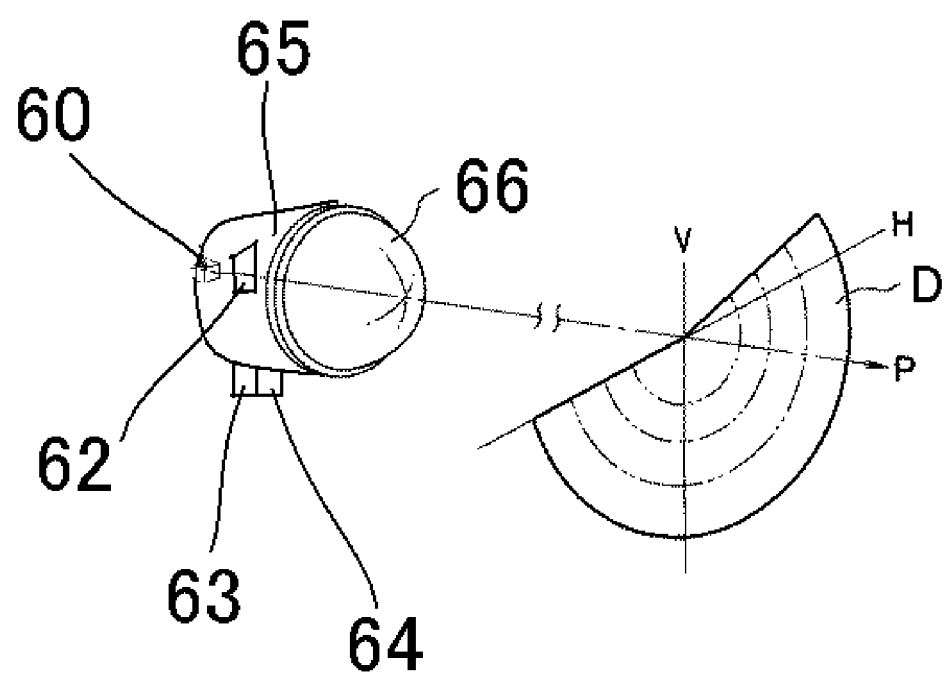
FIG. 9 is a schematic perspective view a second exemplary embodiment of a vehicle headlight made in accordance with principles of the disclosed subject matter.
Figure 10:
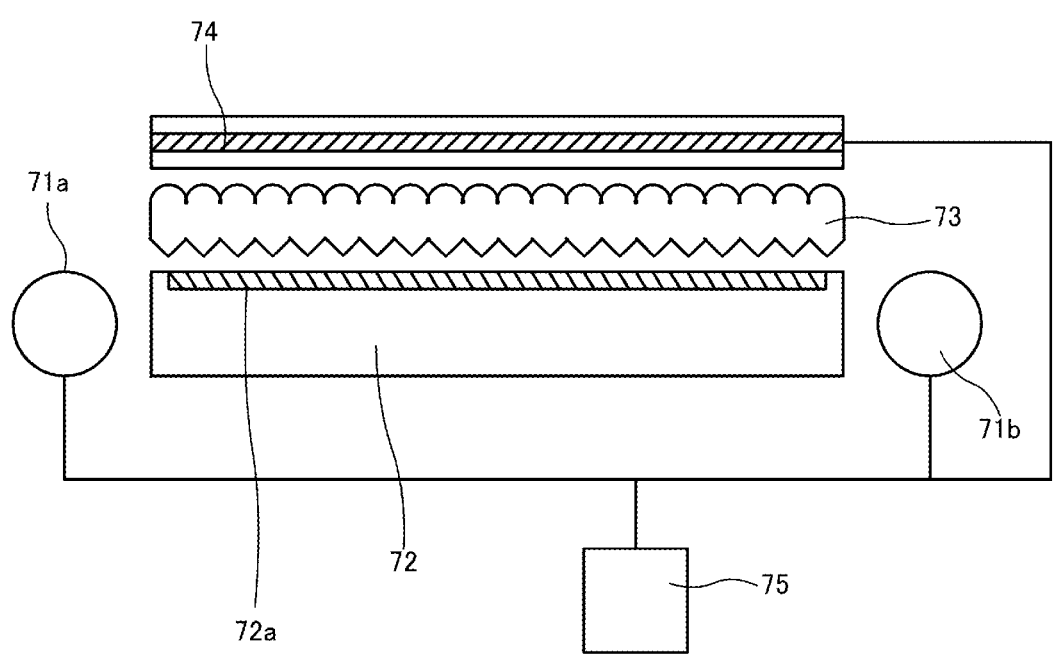
FIG. 10 is a schematic structure showing a conventional stereographic display unit.
Figure 11:
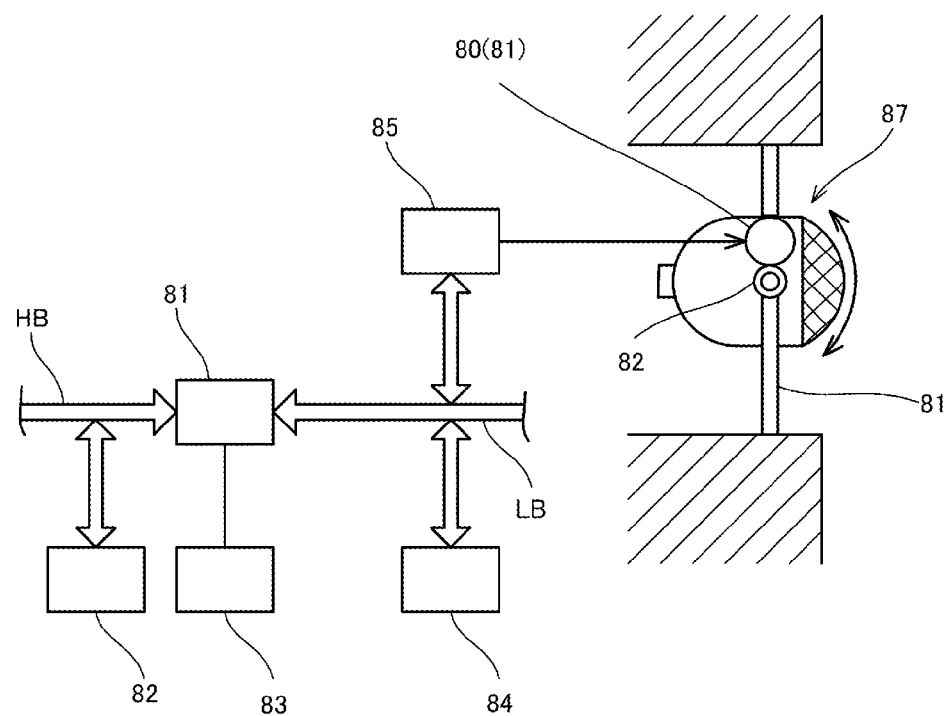
FIG. 11 is a schematic structure showing a conventional vehicle headlight including an automatic level controller.

Vehicle headlights of the disclosed subject matter will now be described with reference to FIG. 8 and FIG. 9. FIG. 8 is a side cross-sectional view showing a first exemplary embodiment of a vehicle headlight made in accordance with principles of the disclosed subject matter. A fundamental structure of the first embodiment of the lighting system is disclosed in Patent Document No. 7 (U.S. Patent Publication No. 2012-0235169), which is an issued patent and is owned by applicant of the presently disclosed subject matter.

The vehicle headlight can include: at least one parabolic reflector 51 having a focus 51a and an opening 51b; a semiconductor light-emitting device 50 having a light-emitting direction located at a substantially focus 51a of the parabolic reflector 51; an outer lens 56 made from a transparent material and located in front of the opening 51b of the parabolic reflector 51; a housing 55 made from an opaque material and attaching the parabolic reflector 51 and the outer lens 56 thereto so as to prevent a leak of light emitted from the semiconductor light-emitting device 50 in outward directions of the parabolic reflector 51 and housing; an optical modulator 52 located between the parabolic reflector 51 and the outer lens 56; a position sensor 53 being located adjacent the housing 55 and being configured to detect at least one of inclined angles in a horizontal direction HD of the headlight with reference to a road and in a vertical direction, which is perpendicular to the horizontal direction HD; and a voltage supply 54 configured to provide the optical modulator 52 with an alternating voltage in accordance with an inclined signal output from the position sensor 53.

According to the above-described vehicle headlight, light emitted from the semiconductor light-emitting device 50 can be reflected by the parabolic reflector 51 and can be emitted from the outer lens 56 in a direction toward a light-emission of the headlight via the optical modulator 2 having a high transmittance. The position sensor 53 can detect at least one of the inclined angles in the horizontal direction HD of the headlight and in the vertical direction perpendicular to the horizontal direction, and can provide the voltage supply 54 with at least one of the inclined angles in the horizontal direction HD and in the vertical direction of the vehicle headlight as inclined data with reference to the road, which is caused due to road conditions, etc.

The voltage supply 54 can vary the light-emitting direction of the headlight using the optical modulator 52 based upon the above-described fundamental operations so that the light-emitting direction of the headlight is directed toward an optimum position in accordance with the inclined data output from the position sensor 53, which can detect at least one of the inclined angles in the horizontal direction HD and in the vertical direction of the headlight. Thus, the vehicle headlight of the disclosed subject matter can project the light emitted from the semiconductor light-emitting device 50 in the optimum direction with a simple structure not including movable parts in accordance with road conditions, etc.

In the above-described embodiment, an inner surface of a prism array of the optical modulator 52 can include a plurality of fine prisms, in which each of the fine prisms extends substantially in a respective one of the horizontal direction HD and the vertical direction with reference to the road and aligns in another respective one of the horizontal direction HD and the vertical direction with reference to the road, respectively, and forms an inclined projection formation in a cross-sectional view from the one of the horizontal direction and the vertical direction. Thereby, the vehicle headlight can easily project the light emitted from the semiconductor light-emitting device 50 in the optimum direction, especially in the horizontal direction and in the vertical direction, with a simple structure not including movable parts in accordance with road conditions such as an upslope, a downward slope, a curved roadway, etc.

In addition, each of initial orientation states of liquid crystal molecules of a first orientation film and a second orientation film of the optical modulator 52 can also be anti-parallel with respect to each other so as to correspond substantially to the respective one of the horizontal direction HD and the vertical direction with reference to the road. Thereby, the vehicle headlight furthermore can easily project the light emitted from the semiconductor light-emitting device 50 in the optimum direction using the above-described optical modulator 52 in accordance with road conditions such as an upslope, a downward slope, a curved roadway, etc FIG. 9 is a schematic perspective view a second exemplary embodiment of a vehicle headlight made in accordance with principles of the disclosed subject matter. A basic structure of the second embodiment of the vehicle headlight is disclosed in Patent Document No. 8 (U.S. patent application Ser. No. 13/747,247), which is owned by applicant of the presently disclosed subject matter.

The second embodiment of the vehicle headlight is an exemplary projector typed headlight for a low beam that can be formed in a small size, and also is an exemplary direct projector type headlight without a reflector. The schematic perspective view shown in FIG. 9 shows a light distribution pattern D formed by the projector headlight in addition to an exemplary structure of the headlight. The light distribution pattern D can include a horizontal cut-off line for a low beam with respect to a horizontal line H and a vertical line V, which is located substantially perpendicular to a road, and can be projected on an imaginary vertical screen, which is approximately 30 meters away from the projector headlight.

The projector headlight can include: a projector lens 66 having an optical axis P and at least one focus located on the optical axis P thereof, and the optical axis intersecting with a substantially intersection of the horizontal line H and the vertical line V; a semiconductor light-emitting device 60 having a light-emitting surface and a light-emitting direction being located near or at (i.e., substantially at) the focus of the projector lens 66 so that the light-emitting direction of the semiconductor light-emitting device 60 is directed toward the projector lens 66; and a housing attaching the semiconductor light-emitting device 60 and the projector lens 66 thereto, and preventing a leak of light emitted from the semiconductor light-emitting device 60 in an outward direction of the housing, wherein the housing is shown by a perspective view in order to facilitate an understanding of an inside part thereof.

Additionally, the projector headlight can also include: an optical modulator 62 such as the above-described optical modulator 2 being located between the semiconductor light-emitting device 60 and the projector lens 66; a position sensor 63 located adjacent the housing 65 and configured to detect at least one of inclined angles in a direction toward the horizontal line H and in a direction toward the vertical line V; and a voltage supply 64 configure to provide the optical modulator 62 with an alternating voltage in accordance with an inclined signal output from the position sensor 63.

The light distribution pattern D including the horizontal cut-off line can be formed on the imaginary vertical screen by the projector headlight using light emitted from the semiconductor light-emitting device 60 via the optical modulator 62 and the projector lens 66. In the case, the light emitted from the semiconductor light-emitting device 60 can be projected on the virtual vertical screen in reverse with respect to the vertical line V. Accordingly, by forming one side of the light-emitting surface of the semiconductor light-emitting device 60 in a line including an elbow line such as the above-described horizontal cut-off line, the light emitted from the semiconductor light-emitting device 60 can form the light distribution pattern D via the optical modulator 62 and the projector lens 240.

In this case, the semiconductor light-emitting device 60 can be used as a light source for a vehicle headlight including a low beam by enlarging a light distribution pattern emitted from the light-emitting surface of the semiconductor light-emitting device 60 and by forming the light-emitting line having a higher contrast. The vehicle headlight can also include a shading mask near the light-emitting surface of the semiconductor light-emitting device 60 if helpful to form the elbow line having a high contrast. In addition, the position sensor 63 can detect at least one of the inclined angles in the direction of the horizontal line H and in the direction of the vertical line V, and can provide the voltage supply 54 with at least one of the inclined angles in the direction of the horizontal line H and in the direction of the vertical line V as inclined data with reference to a road.

The voltage supply 64 can vary the light-emitting direction of the headlight using the optical modulator 52 based upon the above-described principle so that the light-emitting direction is directed toward an optimum position in accordance with the inclined data output from the position sensor 53, which can detect at least one of the inclined angles. Thus, the project type headlight system of the disclosed subject matter can also project the light emitted from the semiconductor light-emitting device 60 in the optimum direction with a simple structure not including movable parts in accordance with road conditions, etc.

Also in the above-described second embodiment, an inner surface of a prism array of the optical modulator 62 can include a plurality of fine prisms so that each of the fine prisms extends substantially in a respective one of the horizontal direction HD and the vertical direction with reference to the road and aligns in another respective one of the horizontal direction HD and the vertical direction with reference to the road, respectively, and so that each of the fine prisms forms an inclined projection formation in a cross-sectional view from the one of the horizontal direction and the vertical direction. Additionally, each of initial orientation states of liquid crystal molecules of a first orientation film and a second orientation film of the optical modulator 62 can also be anti-parallel with respect to each other so as to correspond substantially to the respective one of the horizontal direction HD and the vertical direction with reference to the road.

Thereby, the vehicle headlight can easily project the light emitted from the semiconductor light-emitting device 50 in the optimum direction using the above-described optical modulator 62 with a simple structure not including movable parts in accordance with road conditions such as an upslope, a downward slope, a curved roadway, etc.

According to the above-described vehicle headlights, each of the voltage supplies can vary a light-emitting direction of the headlight using the optical modulator based upon the above-described fundamental structure so that the light-emitting direction is directed toward an optimum position in accordance with the inclined data output from the position sensor. Thus, the disclosed subject matter can provide the vehicle headlight that can project light emitted from the semiconductor light-emitting device in an optimum direction with a simple structure in accordance with road conditions.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art and patent document references described above are hereby incorporated in their entirety by reference.

What is claimed is:

1. A stereographic display apparatus comprising:
a graphic display device having a light incoming surface, a normal line and a polarizer formed in a tabular shape, the polarizer having a polarizing direction, and the graphic display device being configured to show stereographic displays via the polarizer;
a position sensor located adjacent to the graphic display device and being configured to detect an inclined angle in at least one direction with reference to the normal line of the graphic display device;
an optical modulator having a first substrate, a second substrate, a first electrode, a second electrode, a liquid crystal layer, a sealing material and a prism array being formed in a tabular shape, the first substrate having an inner surface, an outer surface and an end portion being made from a transparent material, the outer surface of the first substrate being located on the polarizer of the graphic display device, the second substrate also having an inner surface, an outer surface and an end portion being made from a transparent material, and the second substrate being located such that each of the inner surfaces of the first substrate and the second substrate face each other through at least the liquid crystal layer, the prism array having a refraction index, an inner surface and an outer surface made from a transparent material, the outer surface of the prism array formed in a substantially plane shape, the inner surface of the prism array including a plurality of fine prisms, each of the fine prisms extending in a first direction, aligning in a second direction substantially perpendicular to the first direction and forming an inclined projection formation in a cross-sectional view from the first direction, the prism array being located adjacent the inner surface of the first substrate so that the outer surface of the prism array faces the inner surface of the first substrate, the first electrode having an inner surface being disposed on at least one of the inner surface of the first substrate and the inner surface of the prism array, and prescribing an initial orientation state of liquid crystal molecules disposed in the liquid crystal layer, the second electrode having an inner surface being disposed on the inner surface of the second substrate, the liquid crystal layer having a refraction index of extraordinary light and a refraction index of ordinary light of materials included in the liquid crystal layer, and being formed between the first substrate and the second substrate so as to cover each of the inner surfaces of the first electrode and the second electrode, and thereby defining a thickness of the liquid crystal layer, and the sealing material disposed between the end portion of the first substrate and the end portion of the second substrate and sealing the liquid crystal layer so as to prevent leakage of the liquid crystal in an outward direction of the optical modulator; and
a voltage supply being configured to receive the inclined angle from the position sensor, wherein the voltage supply is configured to apply a voltage to the optical modulator in accordance with the inclined angle output from the position sensor during operation.

2. The stereographic display device according to claim 1, wherein the inclined projection formation of the outer surface of the prism array is formed in a substantially isosceles right triangle shape in the cross-sectional view from the first direction, wherein each of two equal sides of the isosceles right triangle is substantially parallel to a respective one of the first direction and the second direction of the fine prisms of the prism array.

3. The stereographic display apparatus according to claim 1, wherein the refraction index of the prism array is configured to be substantially the same as a mean value of the refraction index of extraordinary light and the refraction index of ordinary light of the materials included in the liquid crystal layer.

4. The stereographic display apparatus according to claim 2, wherein the refraction index of the prism array is configured to be substantially the same as a mean value of the refraction index of extraordinary light and the refraction index of ordinary light of the materials included in the liquid crystal layer.

5. The stereographic display device according to claim 1, wherein the graphic display device includes a liquid crystal display panel (LCD panel) underneath the polarizer of the graphic display device.

6. The stereographic display device according to claim 1, further comprising:
   a light guide having a light-emitting surface, a diffusing surface and a pair of light incoming surfaces made from a transparent material, the light-emitting surface of the light guide formed in a rectangular shape so as to match a shape of the light incoming surface of the graphic display device, the light incoming surfaces being substantially perpendicular to the light-emitting surface of the light guide and being formed in a substantially plane shape, and the diffusing surface of the light guide including a plurality of knurls, the knurls of the diffusing surface being located between the pair of light incoming surfaces, and each of the knurls extending in a direction substantially parallel to the light incoming surfaces of the light guide and aligning in a direction substantially perpendicular to the light incoming surface of the light guide;
   a first light source and a second light source located adjacent to a respective one of the pair of light incoming surfaces of the light guide, respectively;
   a prism sheet having a light-emitting surface and a light incoming surface being located adjacent the light-emitting surface of the light guide so that the light incoming surface of the prism sheet faces the light-emitting surface of the light guide, and located adjacent the light incoming surface of the graphic display device so that the light-emitting surface of the prism sheet faces the light incoming surface of the graphic display device; and
   a controller configured to drive the first light source and the second light source, and to perform the stereographic displays shown by the graphic display device from the outer surface of the optical modulator using light emitted from the first light source and the second light source via the light guide and the prism sheet.

7. The stereographic display apparatus according to claim 5, further comprising:
   a light guide having a light-emitting surface, a diffusing surface and a pair of light incoming surfaces made from a transparent material, the light-emitting surface of the light guide formed in a rectangular shape so as to match a shape of the light incoming surface of the graphic display device, the light incoming surfaces being substantially perpendicular to the light-emitting surface of the light guide and being formed in a substantially plane shape, and the diffusing surface of the light guide including a plurality of knurls, the knurls of the diffusing surface being located between the pair of light incoming surfaces, and each of the knurls extending in a direction substantially parallel to the light incoming surfaces of the light guide and aligning in a direction substantially perpendicular to the light incoming surface of the light guide;
   a first light source and a second light source located adjacent to a respective one of the pair of light incoming surfaces of the light guide, respectively;
   a prism sheet having a light-emitting surface and a light incoming surface being located adjacent the light-emitting surface of the light guide so that the light incoming surface of the prism sheet faces the light-emitting surface of the light guide, and located adjacent the light incoming surface of the graphic display device so that the light-emitting surface of the prism sheet faces the light incoming surface of the graphic display device; and
   a controller configured to drive the first light source and the second light source, and to perform the stereographic displays shown by the LCD panel of the graphic display device from the outer surface of the optical modulator using light emitted from the first light source and the second light source via the light guide and the prism sheet.

8. The stereographic display apparatus according to claim 6, further comprising:
   a reflecting sheet having a top surface located adjacent the diffusing surface of the light guide so that the top surface of the reflecting sheet faces the diffusing surface of the light guide.

9. The stereographic display apparatus according to claim 7, further comprising:
   a reflecting sheet having a top surface located adjacent the diffusing surface of the light guide so that the top surface of the reflecting sheet faces the diffusing surface of the light guide.

10. The stereographic display apparatus according to claim 1, further comprising:
   an active matrix LCD panel located underneath the polarizer;
   a light guide having a light-emitting surface, a diffusing surface and a pair of light incoming surfaces made from a transparent material, the light-emitting surface of the light guide formed in a rectangular shape so as to match a shape of the light incoming surface of the graphic display device, the light incoming surfaces of the light guide being substantially perpendicular to the light-emitting surface of the light guide and being formed in a substantially plane shape, and the diffusing surface of the light guide including a plurality of knurls, the knurls of the diffusing surface being located between the pair of light incoming surfaces of the light guide, and each of the knurls extending in a direction substantially parallel to the light incoming surfaces of the light guide and aligning in a direction substantially perpendicular to the light incoming surface of the light guide;
   a first light source and a second light source located adjacent to a respective one of the pair of light incoming surfaces of the light guide;
   a prism sheet having a light-emitting surface and a light incoming surface being located adjacent to the light-emitting surface of the light guide so that the light incoming surface of the prism sheet faces the light-emitting surface of the light guide, and being located adjacent to the light incoming surface of the graphic display device so that the light-emitting surface of the prism sheet faces the light incoming surface of the graphic display device; and
   a controller including an operation unit, an LCD driving circuit and a light source driver, the operation unit configured to output a light source signal to the light source driver and configured to output an LCD driving signal to the LCD driving circuit, the light source driver configured to drive the first light source and the second light source in accordance with the light source signal output from the operation unit, the LCD driving circuit configured to visualize displays having a parallax image with respect to a right eye and a left eye on the active matrix LCD panel in constant synchronization with the first light source and the second light source in accordance with the LCD driving signal output from the operation unit, and thereby the controller being configured to perform the stereographic displays having a same number of pixels as pixels arranged in the active matrix LCD panel.

11. The stereographic display apparatus according to claim 10, wherein the inclined projection formation of the outer surface of the prism array is formed in a substantially isosceles right triangle shape in a cross-sectional view from the first direction, wherein each of two equal sides of the isosceles right triangle is substantially parallel to a respective one of the first direction and the second direction of the fine prisms of the prism array.

12. The stereographic display apparatus according to claim 10, wherein the refraction index of the prism array is configured to be substantially same as a mean value of the refraction index of extraordinary light and the refraction index of ordinary light of the materials included in the liquid crystal layer.

13. The stereographic display apparatus according to claim 8, wherein the voltage supply is configured to receive the inclined angle from the position sensor via a controller, wherein the voltage supply applies the voltage to the optical modulator in accordance with the inclined angle output from the position sensor via the controller in constant synchronization with visual displays having a parallax image with respect to a right eye and a left eye projected on an LCD panel along with the light emitted from the first light source and the second light source.

14. The stereographic display apparatus according to claim 10, wherein the voltage supply is configured to receive the inclined angle from the position sensor via the operation unit of the controller, wherein the voltage supply applies the voltage to the optical modulator in accordance with the inclined angle output from the position sensor via the operation unit of the controller in constant synchronization with the visual displays having the parallax image with respect to the right eye and the left eye projected on the active matrix LCD panel along with the light emitted from the first light source and the second light source.

15. The stereographic display apparatus according to claim 11, wherein the voltage supply is configured to receive the inclined angle from the position sensor via the operation unit of the controller, wherein the voltage supply applies the voltage to the optical modulator in accordance with the inclined angle output from the position sensor via the operation unit of the controller in constant synchronization with the visual displays having the parallax image with respect to the right eye and the left eye projected on the active matrix LCD panel along with the light emitted from the first light source and the second light source.

16. The stereographic display apparatus according to claim 12, wherein the voltage supply is configured to receive the inclined angle from the position sensor via the operation unit of the controller, wherein the voltage supply applies the voltage to the optical modulator in accordance with the inclined angle output from the position sensor via the operation unit of the controller in constant synchronization with the visual displays having the parallax image with respect to the right eye and the left eye projected on the active matrix LCD panel along with the light emitted from the first light source and the second light source.

* * * * *